(12) United States Patent
Bills et al.

(10) Patent No.: US 6,535,970 B1
(45) Date of Patent: Mar. 18, 2003

(54) METHOD AND APPARATUS FOR ENHANCED PERFORMANCE CACHING FOR PATH NAMES

(75) Inventors: Raymond Allen Bills, Rochester, MN (US); Atul S. Kumar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,311

(22) Filed: Jan. 4, 2000

(51) Int. Cl.[7] ............... G06F 12/00; G06F 17/30
(52) U.S. Cl. .................... 711/207; 711/203
(58) Field of Search .................. 711/203, 207

(56) References Cited

U.S. PATENT DOCUMENTS

| | | | |
|---|---|---|---|
| 5,001,628 A | * | 3/1991 | Johnson et al. ............ 707/10 |
| 5,151,989 A | * | 9/1992 | Johnson et al. ............ 707/10 |
| 5,870,734 A | * | 2/1999 | Kao ............................ 707/2 |
| 5,946,685 A | * | 8/1999 | Cramer et al. ............. 707/1 |

* cited by examiner

*Primary Examiner*—Reba I. Elmore
(74) *Attorney, Agent, or Firm*—Joan Pennington (57) ABSTRACT

A method and apparatus are provided for enhanced performance caching for path names. A vnode is built for a root directory and a path name is stored in a path cache for the vnode for the root directory. A second vnode is built for a second directory and a path name is stored in a path cache for the second vnode. When a next vnode is built for a next directory, then a path name is stored in a path cache for the next vnode. For a given vnode, the path name includes an entire path name that leads to the vnode. A given vnode is enabled to return its entire path name in one step, without reverse traversal.

17 Claims, 11 Drawing Sheets

DIRECTORY TREE 200

VNODES FOR
DIRECTORY TREE 200 vnode for / vnode for a vnode for b vnode for c

FIG. 5

AFTER LOOKUP OF "/"

FIG. 6

AFTER LOOKUP OF "/a"

METHOD AND APPARATUS FOR ENHANCED PERFORMANCE CACHING FOR PATH NAMES

FIELD OF THE INVENTION

The present invention relates generally to the data processing field, and more particularly, relates to a method and apparatus for implementing enhanced performance caching for path names.

DESCRIPTION OF THE RELATED ART

In the IBM AS/400 integrated file system (IFS), every object is abstracted into an internal control block called a vnode. There is an entire architecture based on operations that apply to a given vnode. A vnode is allocated whenever an object in the IFS is used. Vnodes that are in use are considered referenced and the referenced vnodes remain in storage for quick access.

An object in the IFS is known by its path name, which is of the form a/b/c. In this hierarchical path name structure, / is the root directory and c is an object contained in directory b and b is an object contained in directory a and a is an object contained in the root directory. Each component piece of a path name is represented by a separate vnode. Any operation done on object c must first traverse the entire pathname in order to access the vnode for c. This typically describes a normal forward path name resolution.

Similarly, there are several system operations that require a path name construction that operates in reverse order from path name resolution. Path name construction may be understood as follows.

Given a vnode, the entire (absolute) path name must be found that leads to the vnode. For example, given the vnode for C, the goal is to construct the pathname /a/b/c. This is a time consuming operation, because the vnode for an object does not contain specific information about its parent, since a given object may have multiple parents. Therefore in order to construct a full absolute path (one that starts with /), an immediate parent must be found for the object in question, that object's component name is stored and this process repeated until the root directory / is reached. Each time a parent is found, a new vnode for that parent object must be built. Building a vnode is very expensive and coupled with the reverse traversal, this entire operation (path name construction) is time and memory expensive.

This impacts a number of common functions, such as Auditing, Journaling, Reclaim, SAV/RST, GETCURDIR, and Qp0IGetPathFromFileID( ).

A need exists for an improved method and apparatus for enhanced performance caching for path names.

SUMMARY OF THE INVENTION

A principal object of the present invention is to provide a method and apparatus for enhanced performance caching for path names. Other important objects of the present invention are to provide such method and apparatus for enhanced performance caching for path names substantially without negative effect and that overcome many of the disadvantages of prior art arrangements.

In brief, a method and apparatus are provided for enhanced performance caching for path names. A vnode is built for a root directory and a path name is stored in a path cache for the vnode for the root directory. A second vnode is built for a second directory and a path name is stored in a path cache for the second vnode.

In accordance with features of the invention, when a next vnode is built for a next directory, then a path name is stored in a path cache for the next vnode. For a given vnode, the path name includes an entire path name that leads to the vnode. A given vnode is enabled to return its entire path name in one step, without reverse traversal.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
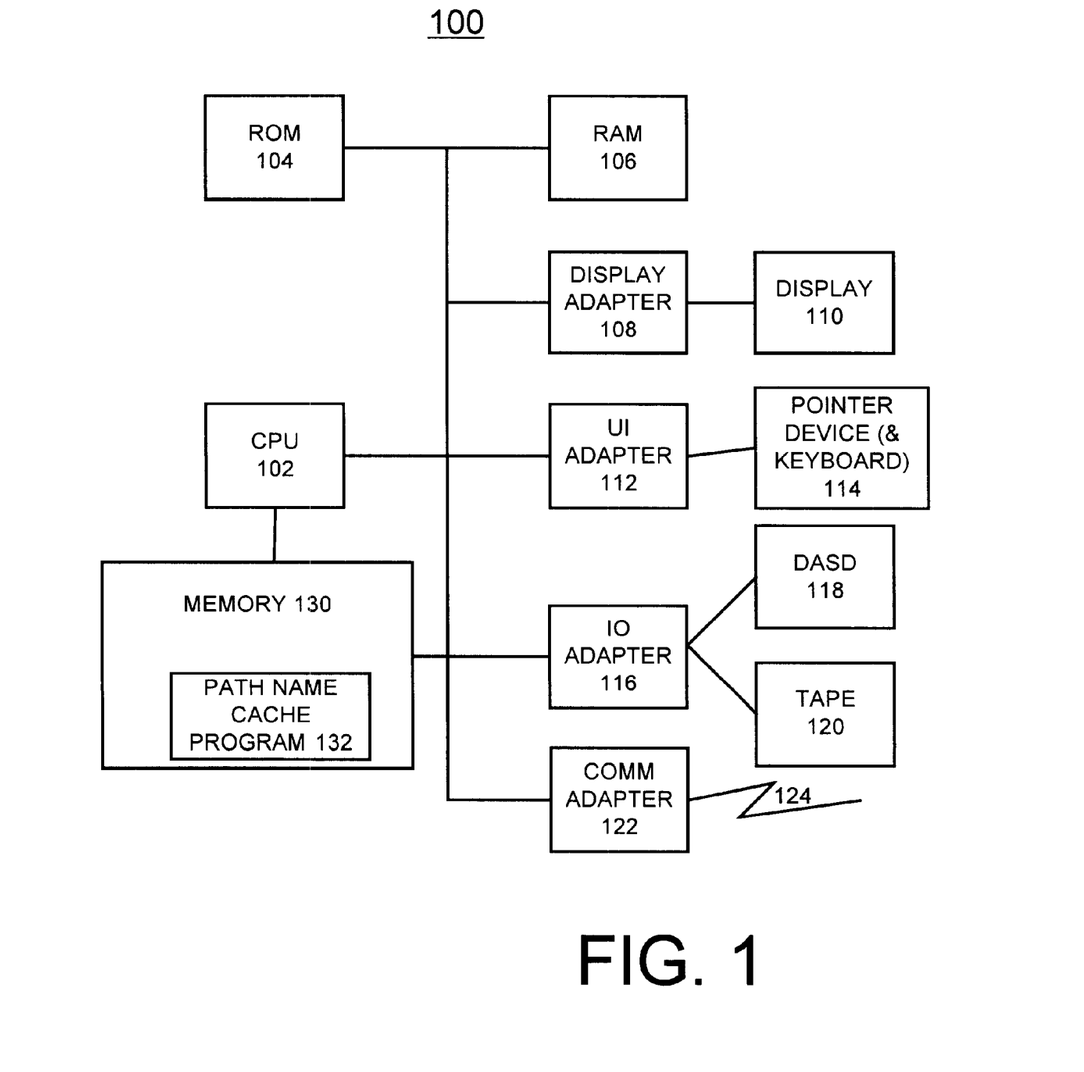
FIG. 1 is a block diagram representation illustrating a computer system for implementing methods for enhanced performance caching for path names in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a read only memory (ROM) 104, a random access memory (RAM) 106, and a display adapter 108 coupled to a display 110. CPU 102 is connected to a user interface (UI) adapter 112 connected to a pointer device and keyboard 114. CPU 102 is connected to an input/output (IO) adapter 116, for example, connected to a direct access storage device (DASD) 118 and a tape unit 120. CPU 102 is connected to a communications adapter 122 providing a communications network connection function with a network 124. The computer system 100 includes a memory 130 storing a path name cache program 132 of the preferred embodiment.

It should be understood that the present invention is not limited to the architecture as shown in FIG. 1. Computer 100 may be implemented using any suitable computer, such as an IBM AS/400 computer. Central processor unit 102 is suitably programmed to execute the charts of FIGS. 5, 6, 8, 9 and 10 of the preferred embodiment.

In accordance with features of the preferred embodiment, path name construction operation is optimized by employing a caching mechanism that enables a given vnode to return it complete path in one step, without any reverse path name traversal. Thus saving the time and memory that would otherwise have been expended through conventional reverse traversal methods. In accordance with features of the preferred embodiment, an entire path for an object is cached in a path cache at its vnode. This is accomplished during normal path resolution. The path cache significantly improves path construction performance since currently the path construction is a resource intensive operation.

Figure 2:
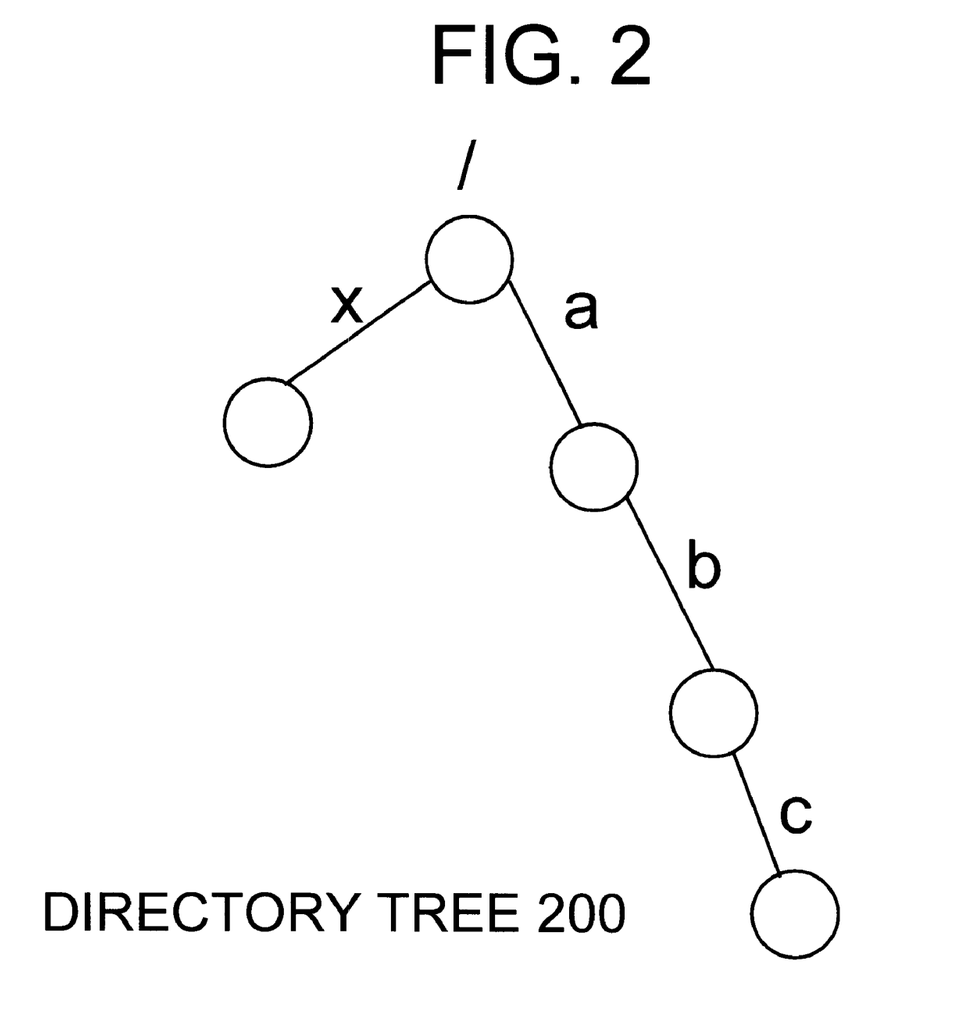
FIG. 2 is a diagram illustrating an exemplary directory tree in accordance with the preferred embodiment.

FIG. 2 is a diagram illustrating an exemplary directory tree 200 in accordance with the preferred embodiment. A root directory / is the highest node of the tree 200. 'a' and 'x' are children of the root directory /. 'b' is a child of '/a'. 'c' is a child of '/a/b'. Each object is known by its absolute path name, for example, 'a/b/c' is the path name for 'c'.

Figure 3:
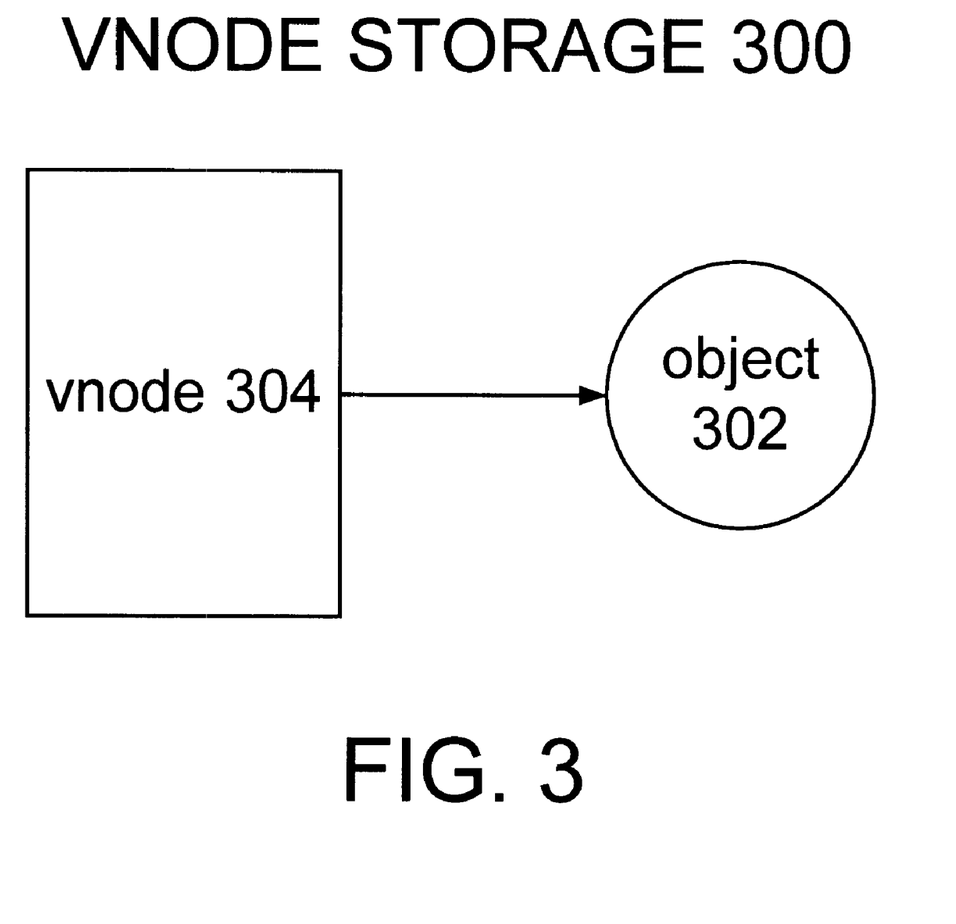
FIG. 3 is a diagram illustrating exemplary vnode storage in accordance with the preferred embodiment.

FIG. 3 is a diagram illustrating exemplary vnode storage 300 in accordance with the preferred embodiment. FIG. 3 shows the relationship between an object 302 and a separate piece of temporary storage called a vnode 304. The vnode 304 is an abstraction of any object and contains things that would apply to all objects like name, size, owner, and other attributes.

Figure 4:
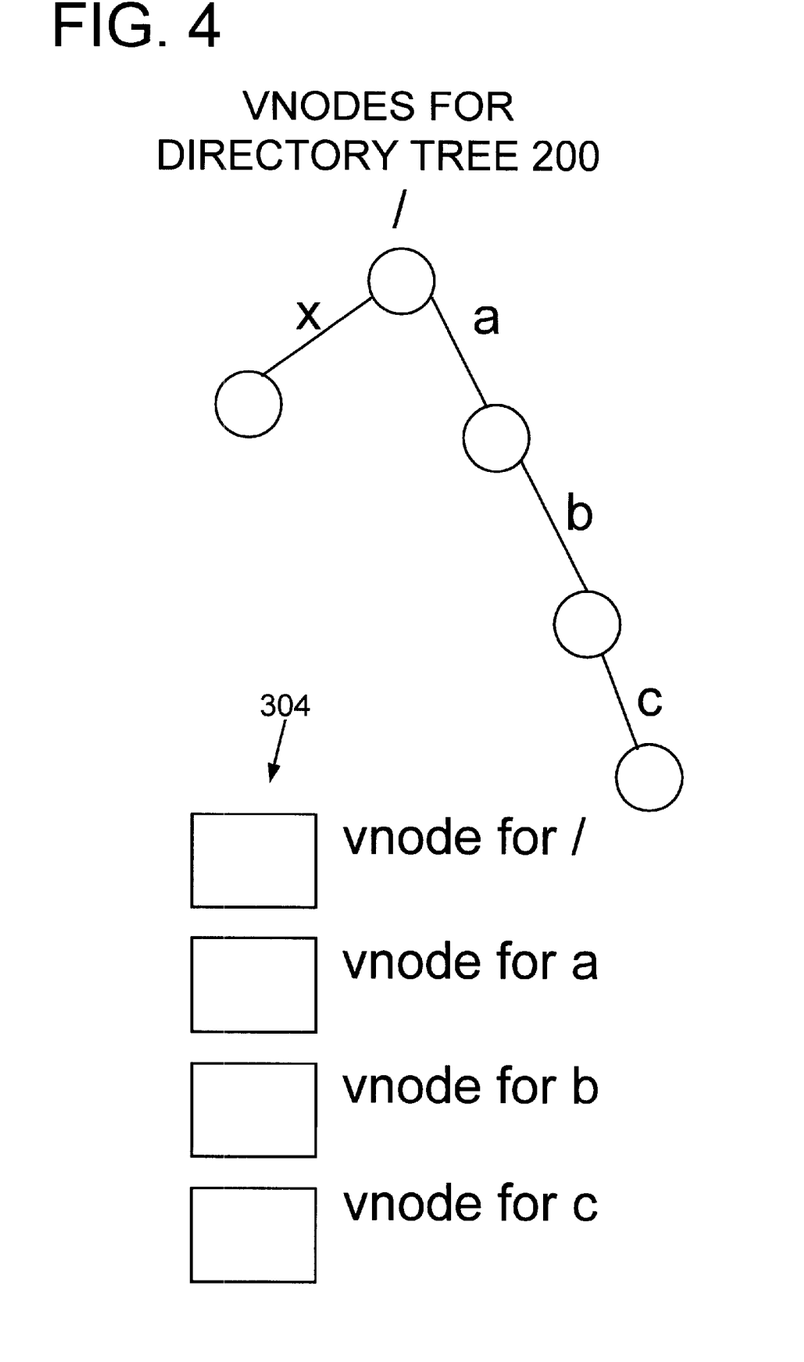
FIG. 4 is a diagram illustrating exemplary vnode storage for the exemplary directory tree of FIG. 2 in accordance with the preferred embodiment.

FIG. 4 is a diagram illustrating exemplary vnode storage for the exemplary directory tree 200 of FIG. 2 in accordance with the preferred embodiment. In FIG. 4, the state of the vnodes 304 for the directory tree 200 are shown before the path name cache is populated with data.

Figure 5:
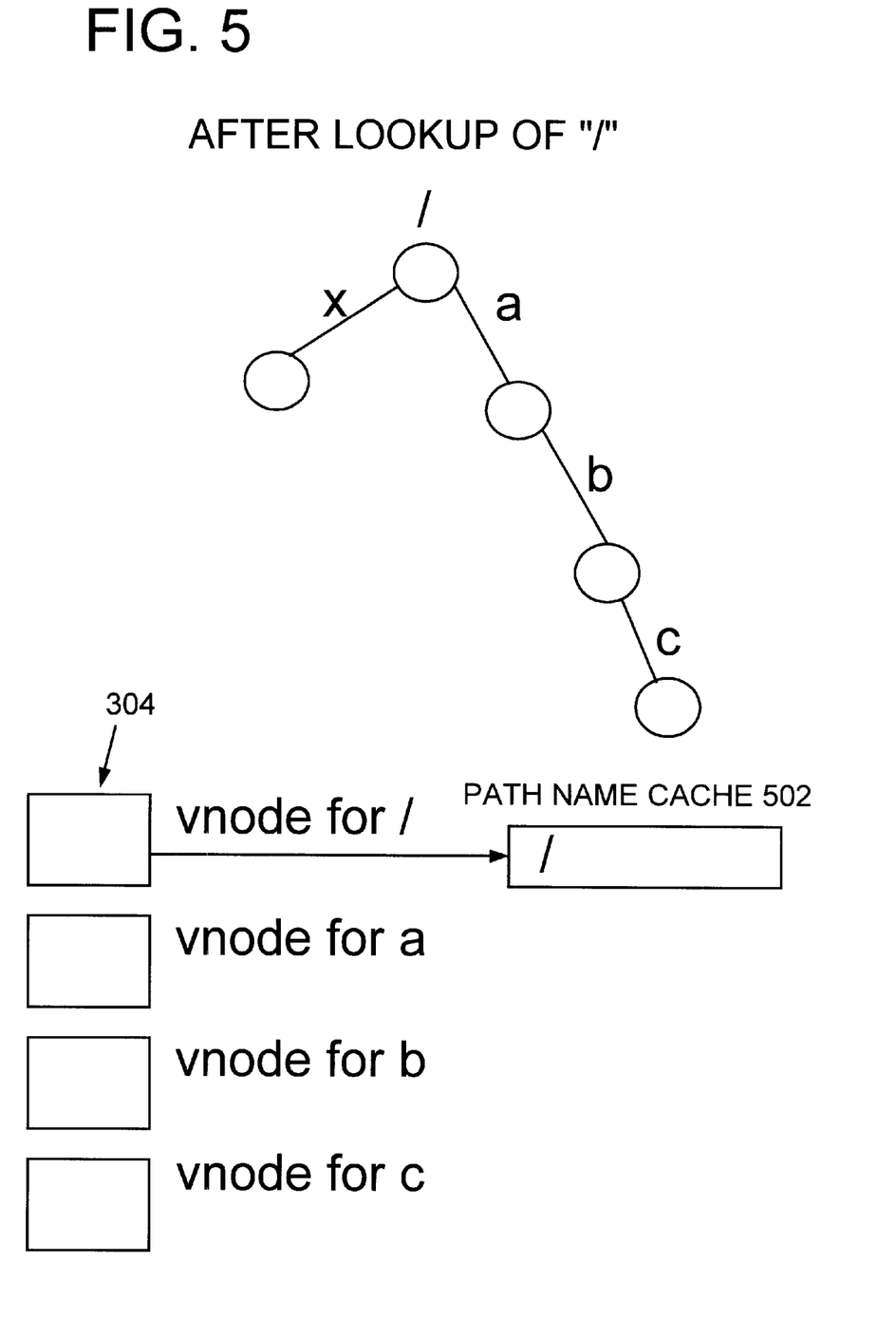
FIG. 5 is a diagram illustrating results of a root directory lookup operation in accordance with the preferred embodiment.

FIG. 5 is a diagram illustrating results of a root directory lookup operation in accordance with the preferred embodiment. After the look up of '/', additional path name storage or cache 502 is allocated and pointed to by the vnode for '/'. Inside this storage 502, the entire absolute path name for the object is stored. In this case, simply '/' is stored. This path is then used as a prefix to the path name storage for any children of '/'.

Figure 6:
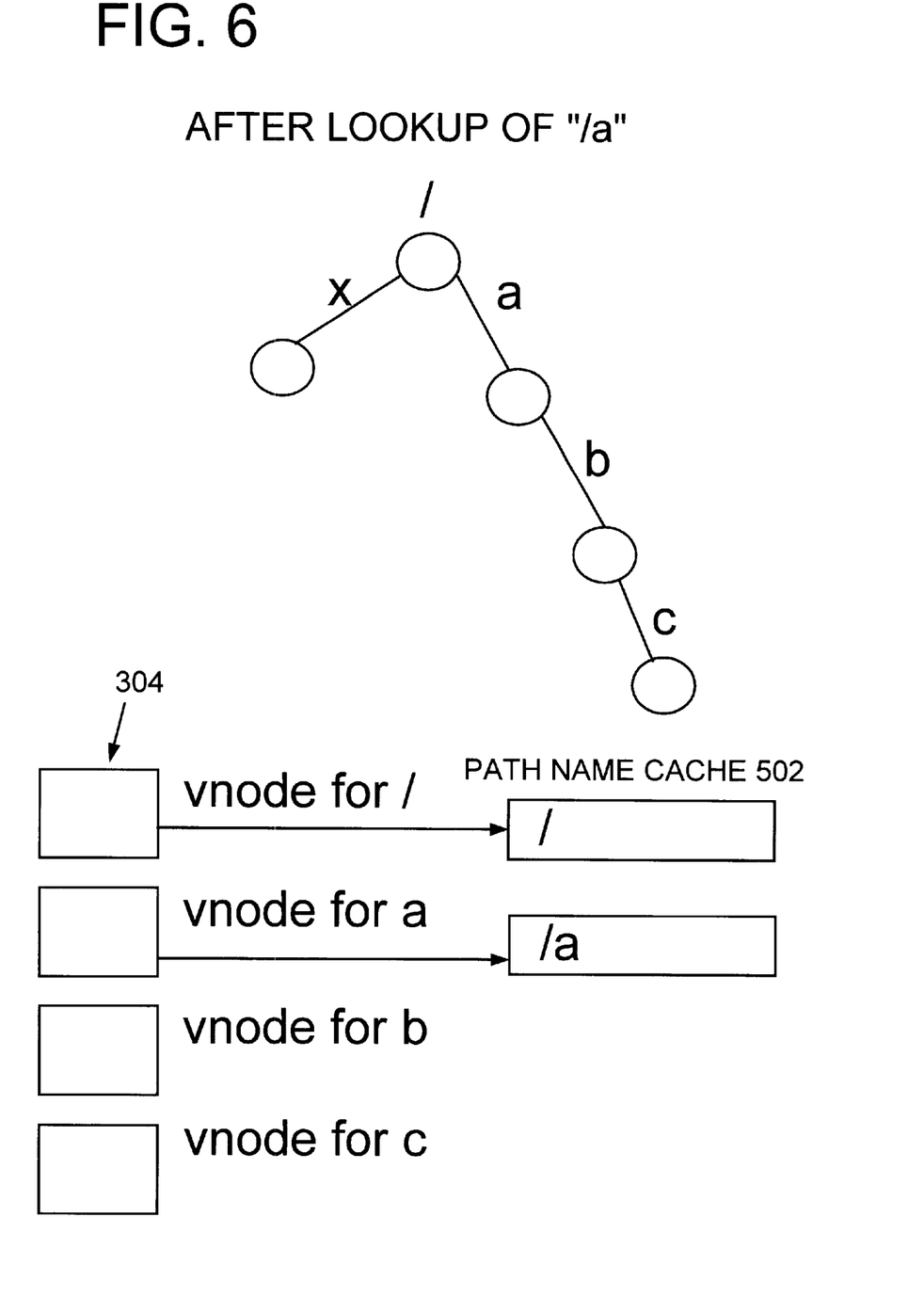
FIG. 6 is a diagram illustrating results of a lookup operation on an object /a in accordance with the preferred embodiment.

FIG. 6 is a diagram illustrating results of a lookup operation on an object /a in accordance with the preferred embodiment. Additional path name cache 502 is allocated and pointed to by the vnode for '/a'. Inside this storage 502, the entire absolute path name for the object is stored. In this case, simply '/a' is stored. This path is then used as a prefix to the path name storage for any children of '/a'.

Figure 7:
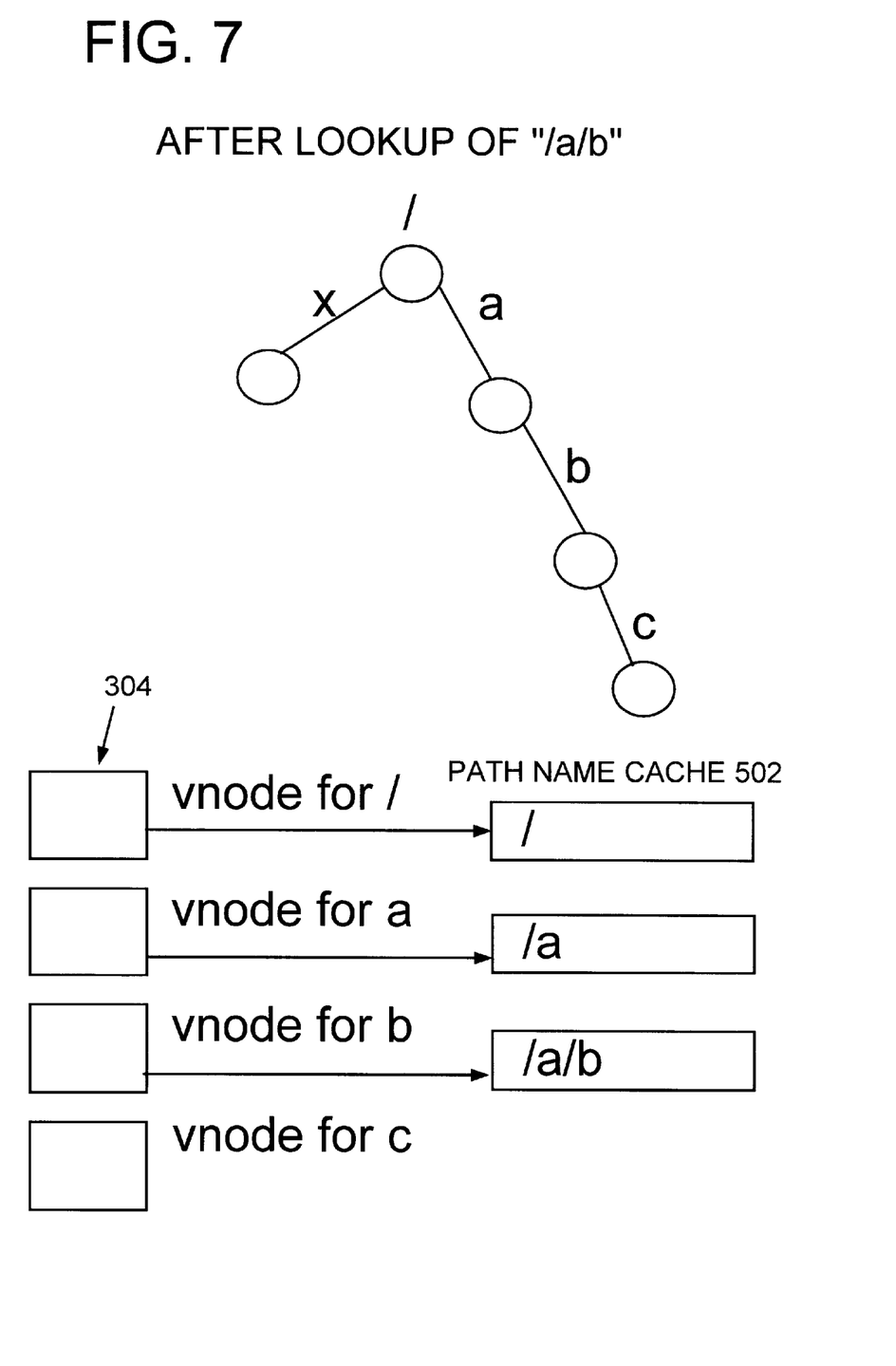
FIG. 7 is a diagram illustrating results of a lookup operation on an object /a/b in accordance with the preferred embodiment.

FIG. 7 is a diagram illustrating results of a lookup operation on an object /a/b in accordance with the preferred embodiment. Additional path name cache 502 is allocated and pointed to by the vnode for '/a/b'. Inside this storage 502, the entire absolute path name for the object is stored. In this case, simply '/a/b' is stored. This path is then used as a prefix to the path name storage for any children of '/a/b'.

Figure 8:
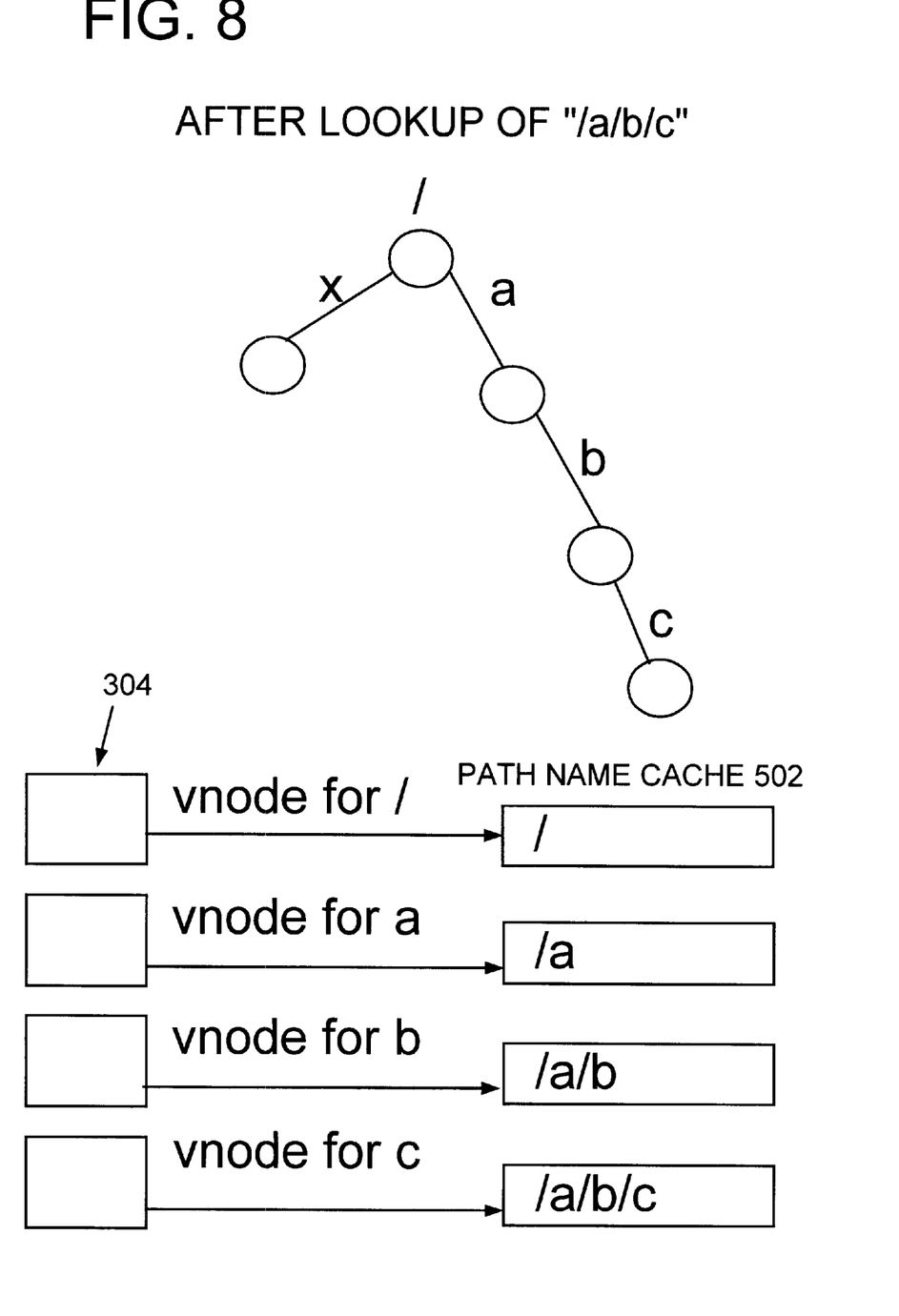
FIG. 8 is a diagram illustrating results of a lookup operation on an object /a/b/c in accordance with the preferred embodiment.

FIG. 8 is a diagram illustrating results of a lookup operation on an object 'a/b/c' in accordance with the preferred embodiment. Additional path name cache 502 is allocated and pointed to by the vnode for '/a/b/c'. Inside this storage 502, the entire absolute path name for the object is stored. In this case, simply '/a/b/c' is stored. This path is then used as a prefix to the path name storage for any children of '/a/b/c'.

Figure 9:
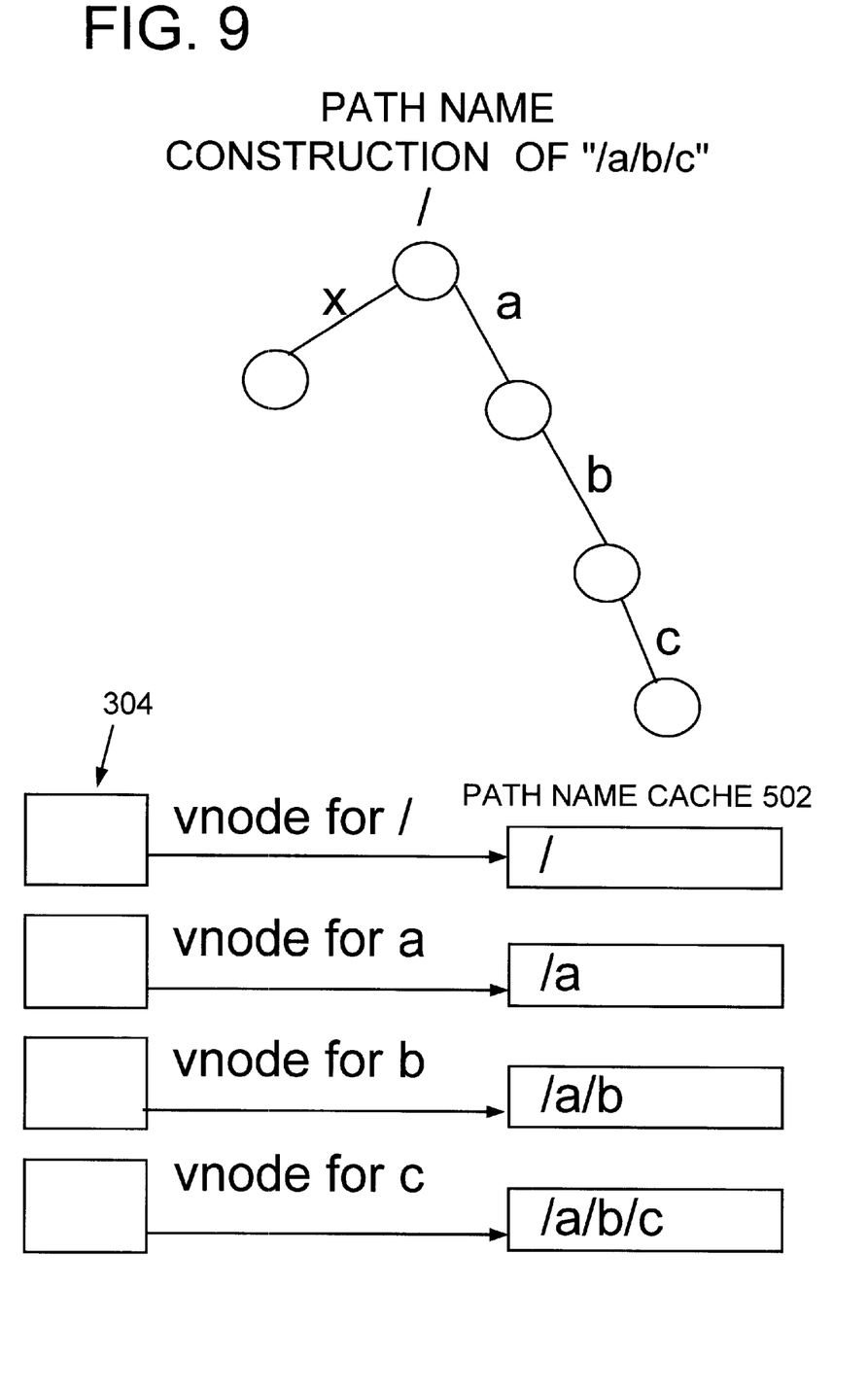
FIG. 9 is a diagram illustrating path name construction of a/b/c once the path name cache has been populated in accordance with the preferred embodiment.

FIG. 9 illustrates the path name construction of a/b/c once the path name cache has been populated in accordance with the preferred embodiment. Note that it is now a one step operation. With the vnode, the pointer is followed to the path name cache entry for this vnode. This completes the one step operation.

Figure 10:
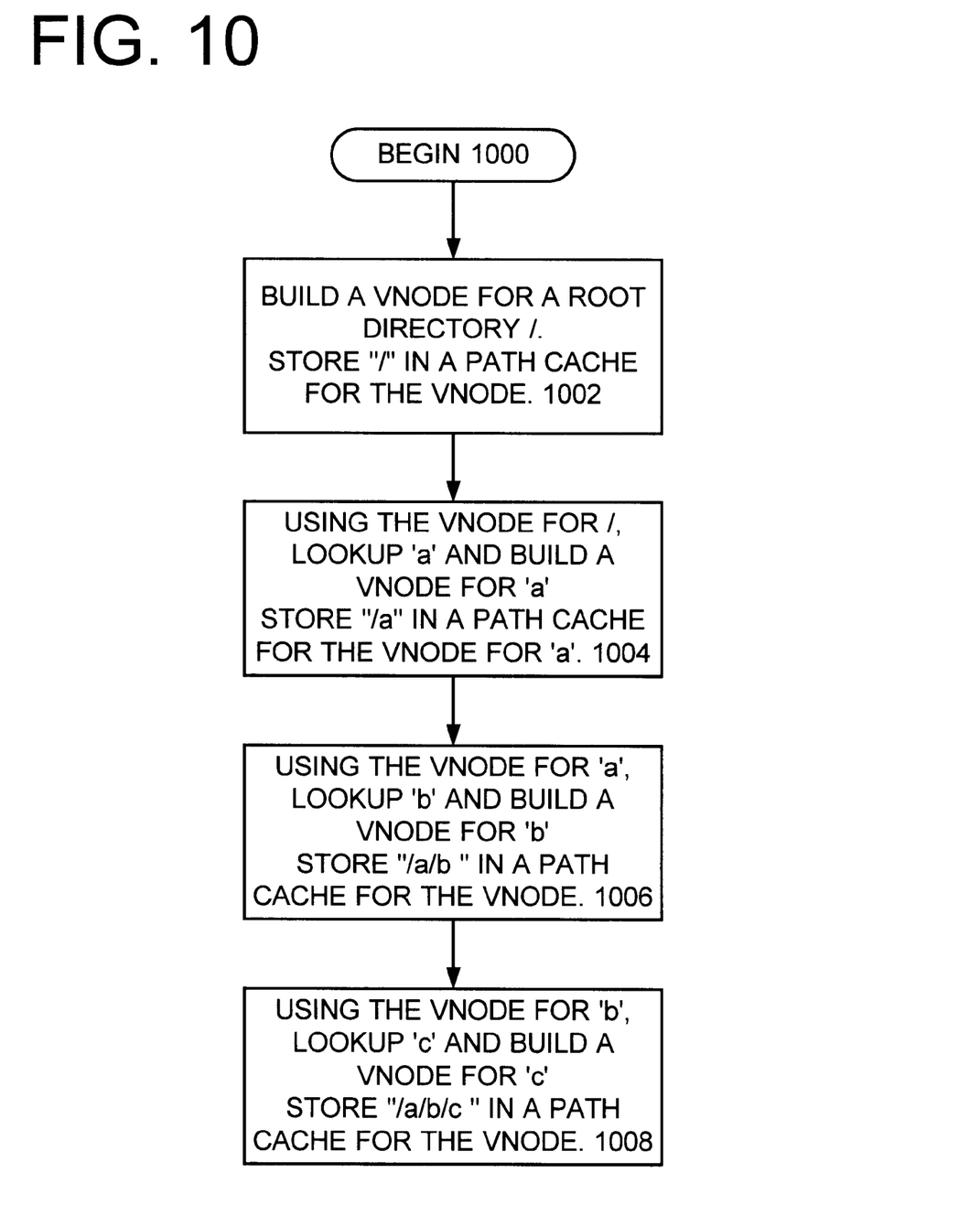
FIG. 10 is a flow chart illustrating exemplary steps of a method for enhanced performance caching for path names in accordance with the preferred embodiment.

FIG. 10 illustrates exemplary steps of a method for enhanced performance caching for path names in accordance with the preferred embodiment as shown in FIGS. 4–9 starting at a block 1000. First a vnode is built for /. Then '/' is stored in the path name cache for the vnode as indicated in a block 1002. Next using the vnode built at block 1002, 'a' is looked up and a vnode for 'a' is built and '/a' is stored in a path cache for the vnode for 'a' as indicated in a block 1004. Using the vnode built at block 1004, 'b' is looked up and a vnode for 'b' is built and '/a/b' is stored in a path cache for the vnode for 'b' as indicated in a block 1006. Using the vnode built at block 1006, 'c' is looked up and a vnode for 'c' is built and '/a/b/c' is stored in a path cache for the vnode for 'c' as indicated in a block 1008. Once a vnode is built, the storage for the vnode will not be released as long as the object is active in a relative sense. The path names stored in the path name cache also are kept.

Figure 11:
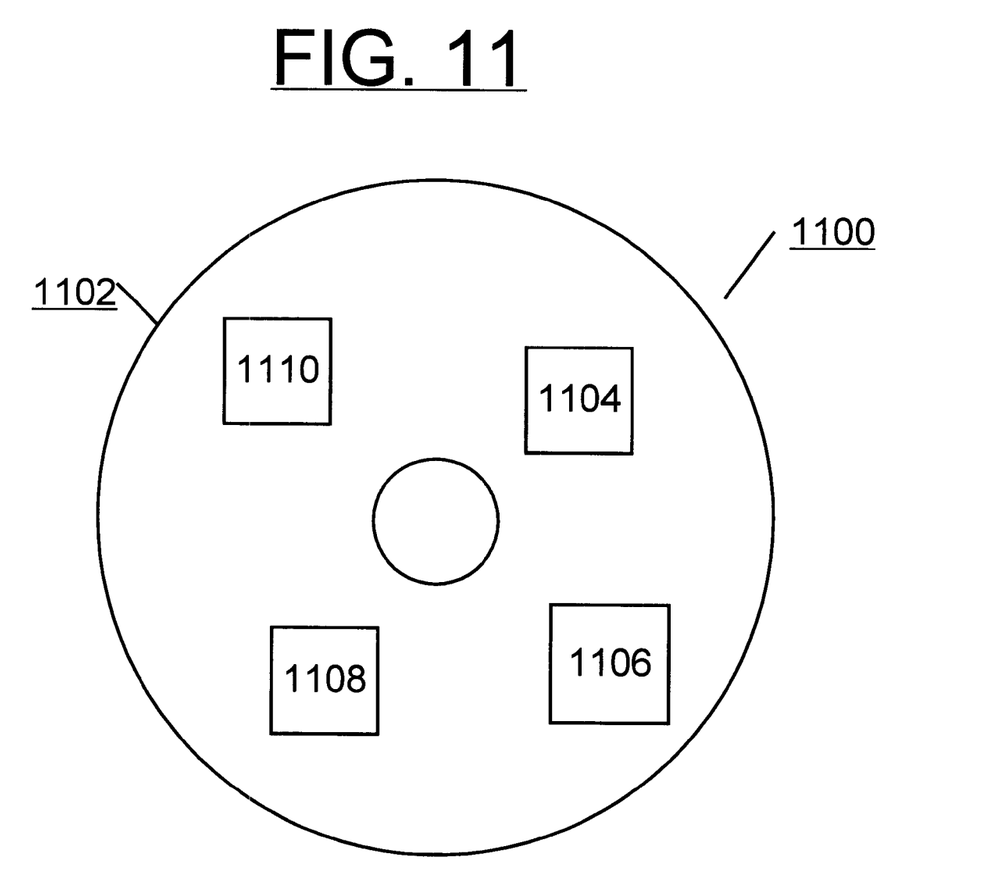
FIG. 11 is a block diagram illustrating a computer program product in accordance with the preferred embodiment.

Referring now to FIG. 11, an article of manufacture or a computer program product 1100 of the invention is illustrated. The computer program product 1100 includes a recording medium 1102, such as, a floppy disk, a high capacity read only memory in the form of an optically read compact disk or CD-ROM, a tape, a transmission type media such as a digital or analog communications link, or a similar computer program product. Recording medium 1102 stores program means 1104, 1106, 1108, 1110 on the medium 1102 for carrying out the methods for implementing enhanced performance caching for path names of the preferred embodiment in the system 100 of FIG. 1.

A sequence of program instructions or a logical assembly of one or more interrelated modules defined by the recorded program means 1104, 1106, 1 108, 1 1 10, direct the computer system 100 for implementing enhanced performance caching for path names of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced performance caching for path names comprising the steps of:
building a vnode for a root directory;
responsive to building said vnode, storing a path name in a path cache for said vnode for said root directory;
building a second vnode for a second directory; and
responsive to building said second vnode, storing a path name in a path cache for said second vnode; each said stored path name including an entire path name for said associated vnode.

2. A method for implementing enhanced performance caching for path names as recited in claim 1 wherein the step of building a second vnode for a second directory includes the steps of using said vnode for said root directory, looking up said second directory and building said second vnode for said second directory.

3. A method for implementing enhanced performance caching for path names as recited in claim 1 wherein the steps of building a vnode for a root directory; and storing a path name in a path cache for said vnode for said root directory includes the steps of building a vnode for a root directory;

storing a path name / in a path cache for said vnode for said root directory.

4. A method for implementing enhanced performance caching for path names as recited in claim 3 wherein the steps of building a vnode for a second directory; and storing a path name in a path cache for said second vnode includes the steps of building a second vnode for a second directory a; and storing a path name /a in a path cache for said second vnode.

5. A method for implementing enhanced performance caching for path names as recited in claim 1 further includes the steps of building a next vnode for a next directory.

6. A method for implementing enhanced performance caching for path names as recited in claim 5 includes the steps of using said second vnode for said second directory, looking up said next directory and building said next vnode for said next directory.

7. A method for implementing enhanced performance caching for path names as recited in claim 6 further includes the step of storing a path name in a path cache for said next vnode.

8. A method for implementing enhanced performance caching for path names as recited in claim 7 wherein the step of storing a path name in a path cache for said next vnode includes the step of storing said path name includes said root directory, said second directory and said next directory.

9. A method for implementing enhanced performance caching for path names as recited in claim 1 wherein each said vnode includes a pointer to said path cache for returning said path name.

10. Apparatus for implementing enhanced performance caching for path names comprising the steps of:

a vnode for a root directory;

a path cache storing a path name for said vnode for said root directory;

a second vnode for a second directory; and a path cache storing a path name for said second vnode; each said stored path name including an entire path name for said associated vnode.

11. Apparatus for implementing enhanced performance caching for path names as recited in claim 10 further includes a next vnode for a next directory.

12. Apparatus for implementing enhanced performance caching for path names as recited in claim 11 further includes a path cache storing a path name for said next vnode.

13. Apparatus for implementing enhanced performance caching for path names as recited in claim 10 wherein said vnode includes a pointer to said path cache storing a path name for said vnode for said root directory.

14. Apparatus for implementing enhanced performance caching for path names as recited in claim 10 wherein said second vnode includes a pointer to said path cache storing a path name for said second vnode for said second directory.

15. A computer program product for implementing enhanced performance caching for path names in a computer system, said computer program product including a plurality of computer executable instructions stored on a computer readable medium, wherein said instructions, when executed by said computer, cause the computer to perform the steps of:

building a vnode for a root directory;

responsive to building said vnode, storing a path name in a path cache for said vnode for said root directory;

building a second vnode for a second directory; and responsive to building said second vnode, storing a path name in a path cache for said second vnode; each said stored path name including an entire path name for said associated vnode.

16. A computer program product for implementing enhanced performance caching for path names as recited in claim 15 wherein the step of building a second vnode for a second directory includes the steps of using said vnode for said root directory, looking up said second directory and building said second vnode for said second directory.

17. A computer program product for implementing enhanced performance caching for path names as recited in claim 15 further includes the step of building a next vnode for a next directory including the steps of using said second vnode for said second directory, looking up said next directory and building said next vnode for said next directory.

* * * * *